US010625652B2

(12) United States Patent
Ludewigt et al.

(10) Patent No.: US 10,625,652 B2
(45) Date of Patent: Apr. 21, 2020

(54) SYSTEM FOR ACCOMMODATING OBJECTS

(71) Applicant: PRO4INNOVATION UG, Tostedt (DE)

(72) Inventors: Thomas Ludewigt, Buchholz (DE); André Delventhal, Neuenkirchen (DE); Lennart Will, Lüneburg (DE)

(73) Assignee: PRO4INNOVATION UG (DE)

( * ) Notice: Subject to any disclaimer, the term of this patent is extended or adjusted under 35 U.S.C. 154(b) by 290 days.

(21) Appl. No.: 15/564,865

(22) PCT Filed: Apr. 8, 2016

(86) PCT No.: PCT/EP2016/057805
§ 371 (c)(1),
(2) Date: Oct. 6, 2017

(87) PCT Pub. No.: WO2016/162508
PCT Pub. Date: Oct. 13, 2016

(65) Prior Publication Data
US 2018/0086246 A1 Mar. 29, 2018

(30) Foreign Application Priority Data

Apr. 10, 2015 (DE) .................. 10 2015 004 394

(51) Int. Cl.
*B60P 1/44* (2006.01)
(52) U.S. Cl.
CPC .............. *B60P 1/4428* (2013.01); *B60P 1/44* (2013.01); *B60P 1/4421* (2013.01); *B60P 1/4442* (2013.01)
(58) Field of Classification Search
CPC .................... B60P 1/4428; B60P 1/4442
See application file for complete search history.

(56) References Cited

U.S. PATENT DOCUMENTS

RE23,546 E 9/1952 Dempster
3,984,014 A * 10/1976 Pohl ...................... B60P 1/4442
414/546

(Continued)

FOREIGN PATENT DOCUMENTS

DE 2840840 A1 4/1980
DE 4112017 A1 10/1992
(Continued)

OTHER PUBLICATIONS

International Search Report for PCT/EP2016/057805; dated Aug. 4, 2016; 2 pgs.

*Primary Examiner* — Saul Rodriguez
*Assistant Examiner* — Ashley K Romano
(74) *Attorney, Agent, or Firm* — Gardner Groff & Greenwald, PC

(57) ABSTRACT

The present invention relates to a system (1, 2, 3) for accommodating objects, comprising a guide assembly (1), which can be arranged in a stationary manner, a first motion assembly (2), which is connected to the guide assembly (1) and which can be moved horizontally in the direction of a longitudinal axis (X) in relation to the guide assembly (1), and a second motion assembly (3), which is connected to the first motion assembly (2) and which can be moved vertically in the direction of a vertical axis (Z) in relation to the first motion assembly (2) and can accommodate objects, wherein the first motion assembly (2) can be moved out in the direction of the longitudinal axis (X) so far over the guide assembly (1) that the second motion assembly (3) can be moved in relation to the first motion assembly (2) past the guide assembly (1) in the direction of the vertical axis (Z).

20 Claims, 3 Drawing Sheets

(56) References Cited

U.S. PATENT DOCUMENTS

Figure 1:
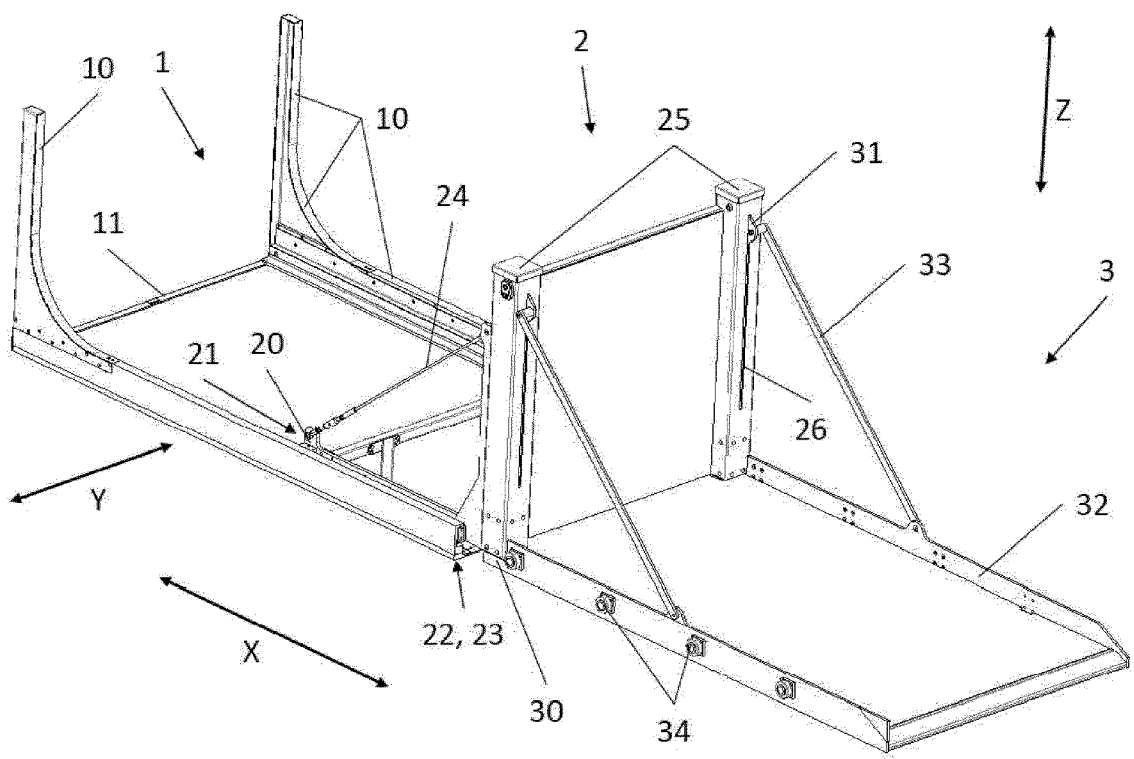

| | | | | |
|---|---|---|---|---|
| 4,133,437 A | * | 1/1979 | Gates | B60P 1/4428 |
| | | | | 187/200 |
| 4,329,100 A | * | 5/1982 | Golze | B60R 9/055 |
| | | | | 177/136 |
| 4,778,328 A | * | 10/1988 | Apgar | B60P 1/4442 |
| | | | | 414/541 |
| 5,261,779 A | * | 11/1993 | Goodrich | B60P 1/4442 |
| | | | | 414/546 |
| 2007/0059135 A1 | * | 3/2007 | Mizner | B60P 1/4442 |
| | | | | 414/462 |
| 2007/0183881 A1 | * | 8/2007 | O'Leary | B60P 1/4442 |
| | | | | 414/546 |
| 2007/0269301 A1 | * | 11/2007 | Eekhoff | B60P 1/4428 |
| | | | | 414/543 |
| 2015/0147144 A1 | * | 5/2015 | Frazier | B60P 1/43 |
| | | | | 414/495 |

FOREIGN PATENT DOCUMENTS

| | | |
|---|---|---|
| DE | 19928646 A1 | 12/2000 |
| DE | 20119560 U1 | 2/2002 |
| DE | 102007035143 A1 | 2/2009 |
| EP | 2574499 A1 | 4/2013 |

* cited by examiner

SYSTEM FOR ACCOMMODATING OBJECTS

The invention relates to a system for receiving objects according to the precharacterizing clause of claim 1.

A wide variety of vehicles for moving on land or on water are known, which can be used for living or for traveling, for expeditions and for special tasks and applications. On land, these can be for example camper trailers and motorhomes as recreational vehicles. Possible service vehicles on land are emergency vehicles of the fire department, the police, technical relief organizations, the armed forces etc. With regard to water, this can refer, in the recreational sector, to sailing vessels, motor yachts etc. and, for special tasks and applications, vessels of the fire department, the police, the coastguard service, customs, maritime search and rescue etc.

An aim when developing vehicles in general, and in particular in the case of the vehicles described above, is to provide as much useful and storage space as possible so that it is possible to carry as many supplies and replacement parts and as much fuel and equipment items etc. as possible during use. This can increase the possible fields of application. In particular, it is frequently desirable to carry additional vehicles or mobile equipment in the main vehicle, which can be removed from the main vehicle as required and used separately. In the case of land vehicles in the recreational sector, these additional vehicles can be bicycles, motorbikes, quads or even small automobiles. This can also be a barbecue, a tent attachment or the like. In the case of service vehicles on land, this can likewise be motorbikes or quads, but also emergency generators, cranes, pumps, barriers, tent attachments and the like. In the case of water vehicles, this can be inflatable rafts, dinghies, for rowing or with outboard motors, from small motor boats to large yachts, depending on the size of the main water vehicle.

For this purpose, it is known in motorhomes, e.g. from DE 28 40 840 A1, that an additional automobile can be received in the tail of the motorhome. This can be moved out of the interior on the one hand via an extendable inclined ramp, wherein the ramp is firstly extended and deposited on the ground at one end and then the automobile has to be moved out of the tail of the motorhome by a person who has to climb into the interior of the automobile for this purpose. This can be very laborious and requires an adequate width of the receiving area just to enable a person to climb in and out of the automobile when this is still in the motorhome.

On the other hand, DE 28 40 840 A1 also alternatively discloses that a lift can be present at the tail of the motorhome, which lift has a supporting frame which can be lowered to the ground. In the elevated state, the lift can be moved horizontally on a ceiling suspension within the motorhome by means of trolleys and cable drums. It is thus possible for an automobile located on the supporting frame to be moved horizontally beyond the rear axle of the motorhome and then be deposited vertically on the ground. It is disadvantageous here that the lowering of the supporting frame has to take place substantially within the external dimensions of the motorhome because the lift can only be moved horizontally within the motorhome owing to the ceiling suspension. The floor of the motorhome thus has to be partially omitted in the region of the receiving area for the purpose of lowering the supporting device, which has a significant influence on the construction of the motorhome, or it has to be partially removable, which increases the cost of implementing this system. A cable construction with freely accessible cables can also be dangerous for the operator. All in all, this mechanism represents a complex solution.

DE 199 28 646 A1 relates to an automobile loading ramp for camper vans, which is formed as an inclined plane and can receive an automobile as an additional vehicle. The automobile loading ramp is arranged on the chassis of the camper van by means of a lifting and lowering device, so that it can be extended out of the camper van to the ground at an incline and can then roll along the ground until the automobile loading ramp lies flat on the ground. It is thus possible for the user to climb comfortably into the automobile after this has been fully released from the camper van. The disadvantage here is that, as a result of the inclined arrangement of the automobile loading ramp in the tail of the camper van, useful and storage space below the automobile loading ramp is wasted. Also, the automobile has to be well secured on the automobile loading ramp because it is always in a sloping position. The removal of this securing means constitutes an additional step for enabling the automobile to be taken off the automobile loading ramp. A complex force transfer to the end of the lifting and lowering device is furthermore necessary because the connection to the automobile loading ramp is located here, whereas the corresponding drive has to be accommodated further forward in the camper van due to space restrictions.

It is known from the company ACTION MOBIL GmbH & Co. KG to provide a lowerable platform at the tail of all-wheel motorhomes and expedition vehicles, such as that known in trucks as a tail lift or platform lift. A tail lift refers to the rear tailboard of a truck, which can be lowered to road level for easier loading and unloading of freight. In this case of all-wheel motorhomes and expedition vehicles, an automobile can be moved onto the horizontally lowered platform from the interior of the main vehicle and then lowered. The disadvantage here is that a huge construction is necessary for this manner of lowering since the platform has to be able to carry, lower and lift the full weight of the automobile. The platform as a tailboard lies at an incline on the ground in the lowered state so that the additional vehicle is also at an incline. The platform is also visible on the main vehicle from the outside in the folded-up state, which can adversely affect the visual impression.

DE 10 2007 035 143 A1 discloses a motorhome which has a receiving means for an automobile, for example, wherein the receiving means is arranged such that it can be lowered between two axles of the motorhome and can be moved transversely to the longitudinal axis of the motorhome. It is thus possible for an automobile which is received and lifted in the receiving means to be transported by the motorhome. If this automobile is to be used, the receiving means can be lowered and extended laterally, so that a person outside the motorhome can climb into the automobile. The disadvantage here is that the ground has to allow a lateral movement to enable this mechanism to be utilized. Accordingly, this mechanism is better suited for use in parking lots and is not provided for grassland and similar soft surfaces, which restricts its use in motorhomes and substantially excludes its use in expedition vehicles and service vehicles. The arrangement of this receiving means on the motorhome is also only possible between the axles.

DE 201 19 560 U1 relates to a loading aid for facilitating the loading and unloading of automobiles/station wagons, vans, pick-up trucks, trailers and similar vehicles with heavy or bulky goods and access to these. The loading aid has a pair of rails which can be arranged in the interior of a trunk of a vehicle, for example. The loading aid furthermore has two linear units which can be guided on the rails. The linear units can be displaced in the horizontal plane. The two linear units are connected to a cross-member in the transverse direction. Load-receiving devices, which can be lowered vertically, can be fastened to the cross-member.

An object of the present invention is to provide a system for receiving objects, e.g. additional vehicles of the type described at the outset, which is simpler, safer and/or more favorable than known systems of this type. In particular, this system should be of a compact construction to minimize the spatial requirement. In particular, this system should have no influence, or as little influence as possible, on the external visual impression of a vehicle, for example, in which the system is used.

The object is achieved according to the invention by the features of the characterizing part of claim 1. Advantageous further developments are described in the subclaims.

The present invention therefore relates to a system for receiving objects. Possible objects are all mobile objects which can be received in another mobile or stationary object. In particular, the term objects refers to small vehicles, e.g. motorbikes, quads or automobiles, which are to be received in a motorhome or the like, i.e. stored and transported therein, so that they can be removed easily, comfortably and safely.

These objects can also be small dinghies etc., which should be capable of being received in larger vessels, in particular such as yachts. In a stationary application, this can be a high-bay racking in which it should be possible to receive objects.

The system has a guide assembly which can be arranged in a stationary manner. A stationary arrangement refers here to fixed mounting on a mobile or stationary object, such as preferably on or in a motorhome. The guide assembly can therefore produce a fixed connection of the movable assemblies of the system for example to a motorhome.

The system furthermore has a first movement assembly, which is connected to the guide assembly and which can be horizontally movable in relation to the guide assembly in the direction of a longitudinal axis. The first movement assembly can therefore execute a relative horizontal movement in one direction, namely along the longitudinal axis, in relation to the guide assembly. This movement can be executed via a drive, e.g. a spindle drive or a hydraulic drive, which can preferably be arranged in a stationary manner, i.e. on the guide assembly. The movement can preferably be executed via a belt drive, wherein the belt is preferably installed in a fixed manner in the vehicle and the drive, preferably an electric motor, is arranged in a fixed manner on the first movement assembly. By means of the drive, the first movement assembly can be pulled in and out of the vehicle via the belt.

The system furthermore has a second movement assembly, which is connected to the first movement assembly and which can be vertically movable in relation to the first movement assembly in the direction of a vertical axis and can receive the objects. The second movement assembly can therefore execute a relative vertical movement in relation to the first movement assembly and receive the objects which are to be received, transported and delivered by means of the system.

According to the invention, it is now provided that the first movement assembly can be moved out over the guide assembly in the direction of the longitudinal axis to the extent that the second movement assembly can be moved in relation to the first movement assembly, past the guide assembly, in the direction of the vertical axis. In other words, the second movement assembly can be extended horizontally beyond the external dimensions of the guide assembly, e.g. moved out of the motorhome, to the extent that it is freely vertically movable. The second movement assembly can thus be lowered and raised past the guide assembly without it being restricted in terms of this movement by the guide assembly.

If the aim is therefore to release a received object, the first movement assembly including the second movement assembly and the object received thereon can be moved from a horizontally retracted state in relation to the guide assembly into a horizontally extended state, in which the second movement assembly projects beyond the external dimensions of the guide assembly in the horizontal direction. In this position, the second movement assembly is located in a vertically retracted state from which it can be transferred into a vertically extended state by being lowered to the ground in the vertical direction. The object can then be removed. The sequence can be reversed for receiving the object.

It is advantageous here that a simple movement can be realized in that a purely horizontal common travel of the first and second movement assembly in relation to the guide assembly and a purely vertical travel of the second movement assembly in relation to the extended first movement assembly can take place. Both movement assemblies can therefore be optimized for the respective movement, which makes the implementation simpler and safer. It is also possible to dispense with inclined or combined movements, which could increase the complexity of the necessary kinematics and control as well as the drives.

It is also advantageous here that the lateral movement can take place above the surface on which the object is to be deposited or from which the object is to be received, i.e. in the air. The surface, i.e. the ground, for carrying out these movements is thus irrelevant. In other words, the system according to the invention can be used irrespective of the surface on which the motorhome, for example, is located.

It is furthermore advantageous that the construction of the system can be effected compactly because the individual movements can proceed in succession, orthogonally to one another and in a simple manner. This can save on space, which can always be very relevant in the vehicles described above. In other words, a waste of volume in the interior of the vehicle can be avoided by the compact construction of the system according to the invention and its orthogonal movement sequences.

It is also advantageous that a separate device, for example a forklift or crane, is not needed for receiving and removing the objects because all the required lifting and lowering mechanisms are integrated in the system itself.

It is furthermore advantageous that the drives and mechanics required for the movement sequence are fully arranged in the interior of the vehicle and can remain hidden from the outside. It is thus possible to prevent the look of a motorhome or a yacht, for example, from being impaired.

It is furthermore advantageous that, in the system according to the invention, the received objects can also be removed individually. To this end, the system can be fully extended and lowered to the ground so that all received objects can be clearly visually perceived from all sides and removed individually or otherwise rearranged. It is thus possible to extend the system merely horizontally so that the received objects are also comparatively easily accessible, but are not able to, or do not have to, come into contact with wet or dirty ground, for example. In both cases, it is possible, for example, to avoid a person having to crawl into a loading area or the like in order to reach the sought objects. In this case, it might also be necessary to firstly rearrange individual objects or to clear them out of the receiving area in order to reach the sought object, which can be avoided with a freely-accessibly presented second movement assembly according to the present invention. It is furthermore thus possible to dispense with load-securing systems, since the objects on the second movement assembly can be enclosed in the interior of the vehicle. This can increase the vehicle safety.

The receiving means of the second movement assembly is preferably designed in such a way that it can receive and also hold the object(s) securely owing to its contour. It is thus possible to dispense with additional securing means or to assist with securing. For example, depressions can be provided, in which the wheels of an automobile can come to rest and be disabled in their rolling direction. In the case of dinghies, the contour of the receiving means can correspond to the contour of the underside of the dinghy, so that the dinghy can be encompassed and thus secured as it is lifted out of the water. When the device is applied to yachts, for example, it is thus possible to dispense with belts and cranes, which are very complex in terms of handling and can greatly impair the look of a yacht.

The elements of the system can be made partially or entirely of metal, in particular of steel, or of plastics material, in particular of fiber-reinforced plastics material.

According to one aspect of the present invention, the first movement assembly has a horizontal frame part and a vertical frame part, wherein the horizontal frame part of the first movement assembly connects the first movement assembly to the guide assembly such that it is movable in the direction of the longitudinal axis, and wherein the vertical frame part of the first movement assembly connects the second movement assembly to the first movement assembly such that it is movable in the direction of the vertical axis. In other words, via its horizontal frame part, the first movement group produces a horizontally movable connection to the guide assembly for itself and the second movement assembly. The second movement assembly is in turn vertically movable in relation to the first movement assembly via its vertical frame part.

It can thus be achieved that the second movement assembly and the objects received thereby can firstly be moved horizontally in relation to the stationary guide assembly by means of the first movement assembly in order to be transported outwards from the interior of a motorhome, but raised in relation to the ground. The lowering of the second movement assembly in relation to the first extended movement assembly can then take place in order to deposit the objects on the ground. A transformation from a horizontal to a vertical movement can thus take place between the guide assembly and the second movement assembly, as it were, via the first movement assembly.

According to a further aspect of the present invention, the horizontal frame part of the first movement assembly and the vertical frame part of the first movement assembly are connected to one another by a diagonal connecting element, preferably by a pair of diagonal connecting elements. A diagonal force transfer can take place via this diagonal connecting element so that the forces and moments, which can act on the vertical frame part of the first movement assembly owing to the second movement assembly and the objects received there, can be at least partially, preferably mostly, transferred to the horizontal frame part of the first movement assembly. This improves the stability of the first movement assembly or reduces the weight thereof with the same stability. The diagonal connecting elements are preferably formed as diagonal struts. As a result of the arrangement in pairs of the diagonal connecting elements, the lateral stability can be increased and a tilting during the horizontal movement can be prevented.

According to a further aspect of the present invention, the horizontal frame part of the first movement assembly and the vertical frame part of the first movement assembly are connected to one another by a pivot connection so that the horizontal frame part of the first movement assembly can be swiveled in relation to the vertical frame part of the first movement assembly between the direction of the longitudinal axis and the direction of the vertical axis. This pivot connection can be realized for example via a hinge or by means of bolts. These are preferably arranged in pairs to prevent tilting.

This pivot connection enables the horizontal frame part to be folded upright in the vertical direction in the retracted state of the system. This can be achieved in that, during the retraction, the weight of the second movement assembly is increasingly transferred directly to the guide assembly and the load on the horizontal frame part of the first movement assembly is thus relieved to the extent that this can finally be folded upright without a load. This can considerably reduce the necessary installation space required for this system in the direction of the longitudinal axis.

According to a further aspect of the present invention, the connecting element is formed such that it can be shortened. This means that the connecting element is not formed to be rigid but such that it can be reduced in terms of its length, e.g. foldably as a hinge mechanism, so that the connecting element can be folded together in two parts by means of a hinge. The connecting element can also be formed as a cable, in particular as a steel cable. In all cases, the connecting element then has its maximum length, preferably in the diagonal direction between the horizontal and vertical frame parts, when the horizontal frame part of the first movement assembly is folded down in the horizontal plane. The greatest possible force transfer can thus take place during the movement sequence. At the same time, the horizontal frame part of the first movement assembly can be folded vertically upright.

According to a further aspect of the present invention, the horizontal frame part of the first movement assembly has at least two guide elements, preferably two rollers, with which the horizontal frame part of the first movement assembly is movably connected to the guide assembly. The desired relative movability can thus be effected simply and reliably.

A roller can preferably be folded upright with the horizontal frame part to reduce the length of the first movement assembly in the direction of the longitudinal axis. In the folded-down state, this roller can transfer a substantial part of the weight of the two movement assemblies to the guide assembly because it is arranged furthest inside the motorhome or the guide rail, i.e. it can be subjected to the greatest moment. The second roller can continue to be guided horizontally in the guide rail and, in the horizontally extended state, can represent the pivot point for the moments and forces which are to be transferred from the second movement assembly to the guide assembly.

According to a further aspect of the present invention, the guide assembly has at least one guide rail, preferably a pair of guide rails, in which the first movement assembly, preferably the rollers of the first movement assembly, can be movably guided. The desired relative movability can thus be enabled simply and reliably in that the rollers roll along the guide rail and can thus move in a smoothly and securely guided manner. A guide-rail pair can preferably be used to enable better distribution of the forces and thus to help prevent tilting.

The guidance of the first movement assembly "in" the guide rail means that relatively secure guidance takes place. However, this guidance can also include the first movement assembly being arranged such that it is movable along or on the guide rail or around the guide rail.

According to a further aspect of the present invention, the guide rail(s) is/are formed in a U shape. The rails of the guide assembly can therefore not only support the rollers of the first movement from below, but also guide them laterally and encompass them from above and thereby hold them. Encompassing them from above is particularly advantageous as it is thus possible to prevent the two movement assemblies from tipping in the horizontally extended state. The desired relative movability can thus be effected simply and reliably. In other words, the U-shaped guide rail can encompass the rollers laterally and thus considerably improve the stability of the movement. This is particularly the case when a pair of U-shaped guide rails are used, which are preferably arranged with their openings aligned towards one another.

According to a further aspect of the present invention, the guide rail(s) is/are formed such that they are upwardly curved in portions in the direction of the vertical axis. A deflection of the movement of the horizontal frame part of the first movement assembly in relation to the guide assembly from a horizontal movement to a vertical movement can thus be enabled to enable the horizontal frame part of the first movement assembly to be folded upright during the retraction.

According to a further aspect of the present invention, the second movement assembly has a vertical frame part and a horizontal frame part, wherein the vertical frame part of the second movement assembly connects the second movement assembly to the first movement assembly such that it is movable in the direction of the vertical axis, and wherein the horizontal frame part of the second movement assembly is formed for receiving objects. The two vertical frame parts of the two movement assemblies are preferably connected to one another. The lowering and lifting of the horizontal frame part of the second movement assembly, which can receive the object to be handled, can thus be enabled.

According to a further aspect of the present invention, the vertical frame part of the second movement assembly is movable in relation to the first movement assembly, in particular in relation to the vertical frame part of the first movement assembly, by means of a spindle drive or a hydraulic drive. These drives enable a high force to be achieved with a compact construction. In particular, the two types of drive can be integrated in the vertical frame part of the first movement assembly in the vertical direction so that they do not have to be moved with the second movement assembly. These drives can thereby also be arranged hidden from view, which can improve the visual impression of the system.

According to a further aspect of the present invention, the vertical frame part of the second movement assembly is arranged within the vertical frame part of the first movement assembly such that it is movable in the direction of the vertical axis. This can enable a compact construction with vertical movability. These drives can then also be arranged hidden from view, which can improve the visual impression of the system.

According to a further aspect of the present invention, the vertical frame part of the second movement assembly and the horizontal frame part of the second movement assembly are connected to one another by a diagonal connecting element, preferably by a pair of diagonal connecting elements. A diagonal force transfer can take place via this diagonal connecting element, so that the forces and moments, which can act on the vertical frame part of the second movement assembly owing to the horizontal frame part of the second movement assembly and the objects received therein, can be at least partially, preferably mostly, transferred to the vertical frame part of the second movement assembly. This improves the stability of the second movement assembly or reduces the weight thereof with the same stability. The diagonal connecting elements are preferably formed as diagonal struts.

According to a further aspect of the present invention, the vertical frame part of the first movement assembly has at least one vertical recess, preferably a pair of vertical recesses, in which a projection—preferably projections—of the vertical frame part of the second movement assembly can extend in a vertically movable manner, wherein the diagonal connecting element is connected to the vertical frame part of the second movement assembly via the projection. A compact and secure guidance of the vertical frame part of the second movement assembly in the vertical frame part of the first movement assembly is thus enabled, whilst the force transfer via the diagonal connecting element can take place at the same time to utilize the advantages thereof.

According to a further aspect of the present patent application, the second movement assembly, preferably the horizontal frame part of the second movement assembly, has a plurality of movement elements, preferably a plurality of rollers, by means of which the second movement assembly can be guided such that it is movable in relation to the guide assembly in the direction of the longitudinal axis. In the retracted state, this enables a guided and supported movement of the second movement assembly in relation to the guide assembly. This is advantageous since the first movement assembly does not then have to be able to transfer the full weight of the second movement assembly to the guide assembly and it is thus optionally possible for its horizontal frame part to be folded upright in the retracted state.

Figure 2:
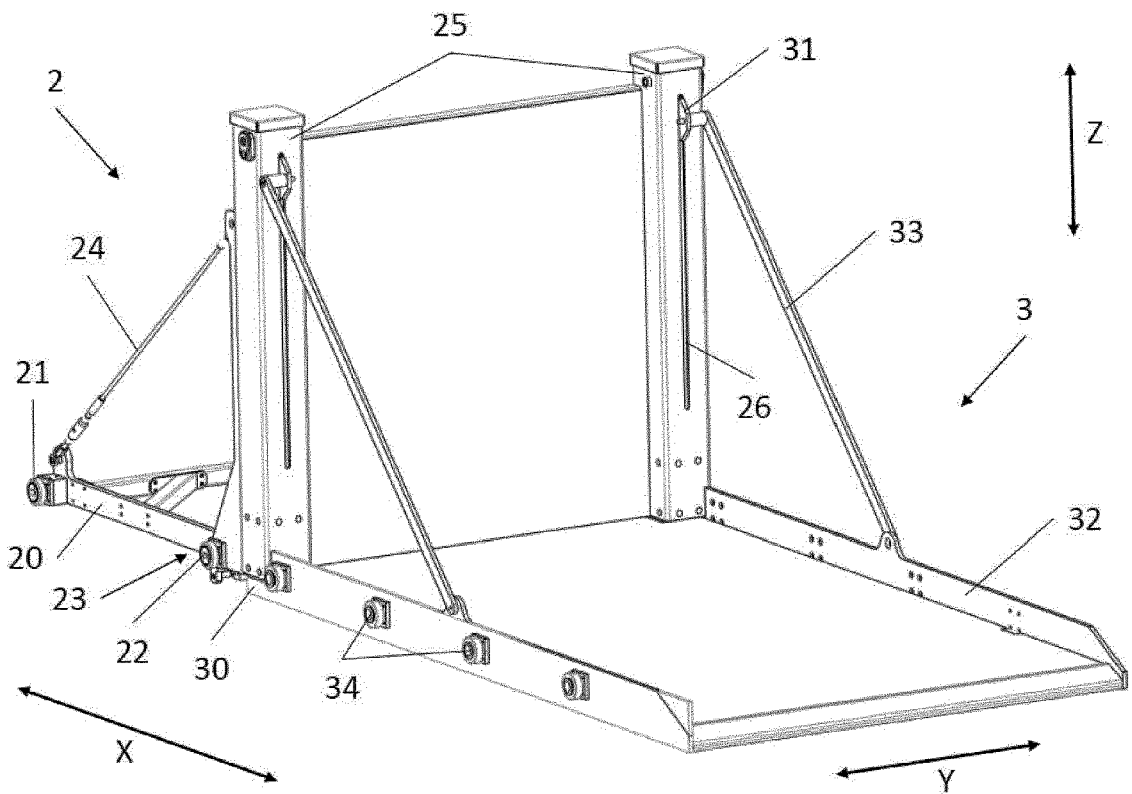
Figure 3:
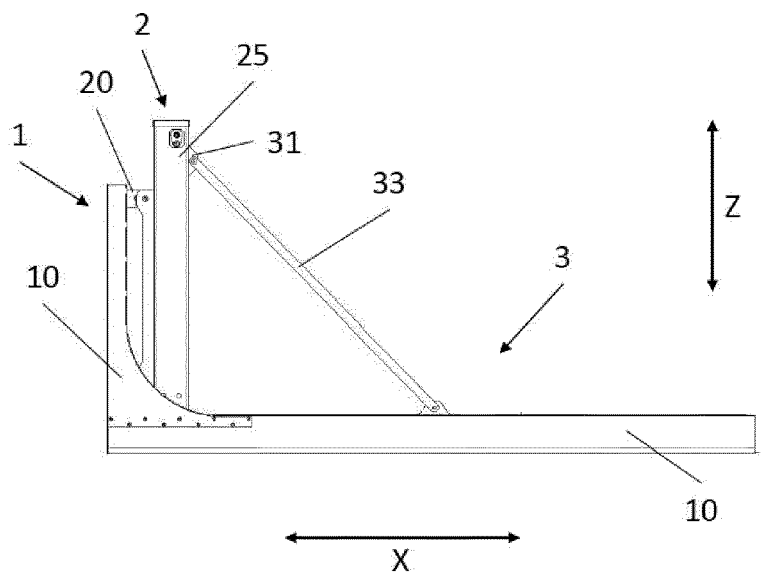
Figure 4:
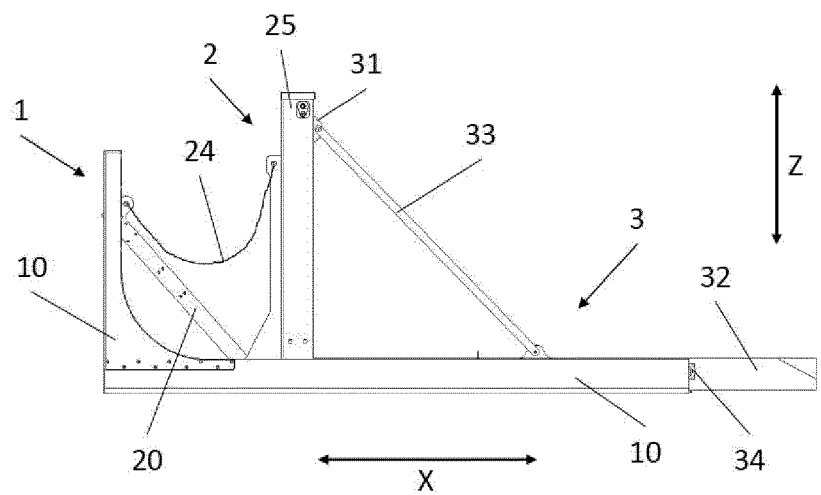
Figure 5:
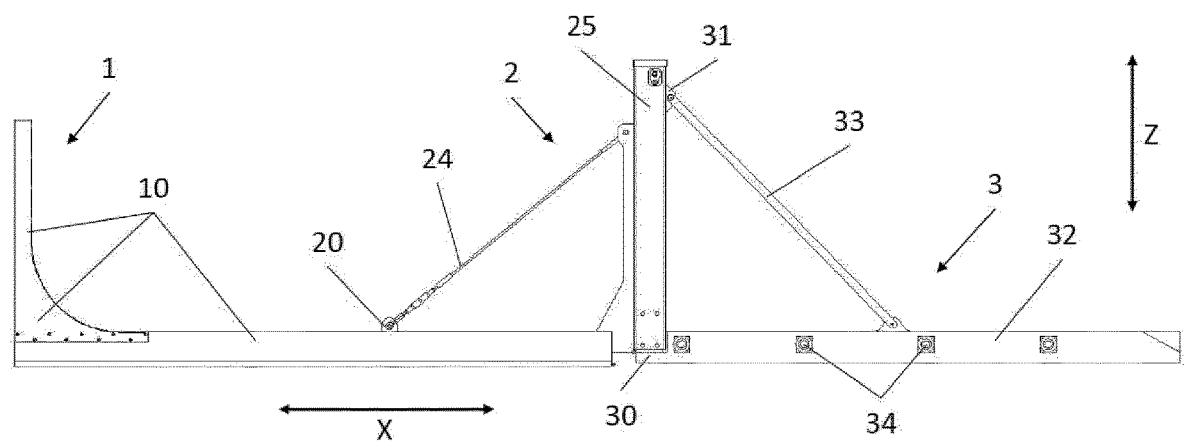
Figure 6:
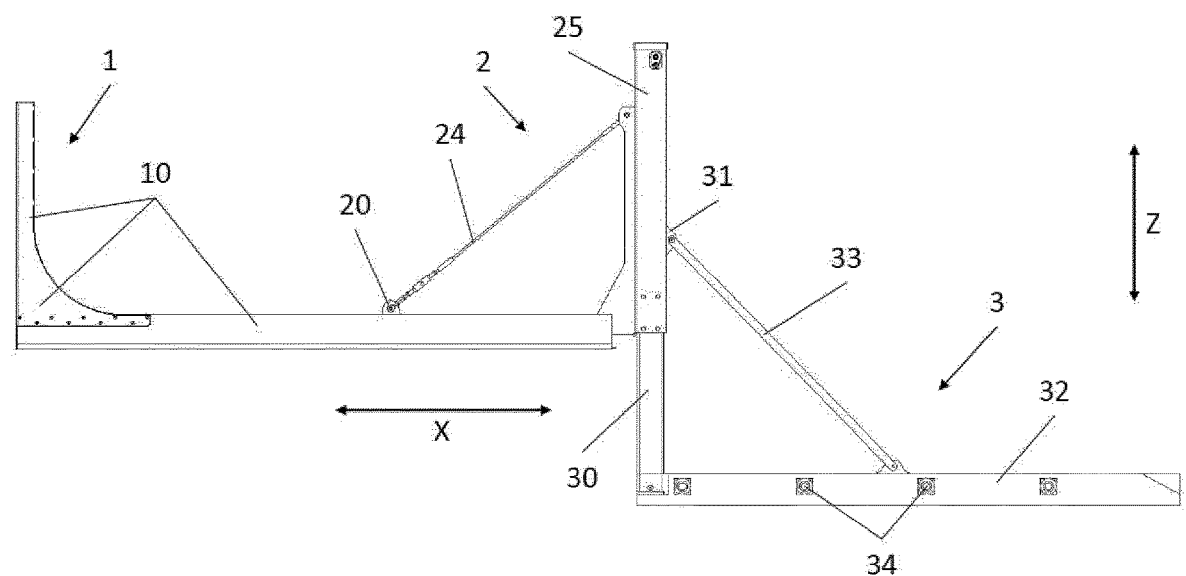

An exemplary embodiment and further advantages of the invention are explained below in conjunction with the following figures, which show:

FIG. 1 a perspective schematic illustration of a system according to the invention in a horizontally fully extended state;

FIG. 2 the illustration of FIG. 1 without the guide assembly;

FIG. 3 a lateral schematic illustration of a system according to the invention in a fully retracted state;

FIG. 4 a lateral schematic illustration of a system according to the invention in a horizontally partially extended state;

FIG. 5 a lateral schematic illustration of a system according to the invention in a horizontally fully extended state; and FIG. 6 a lateral schematic illustration of a system according to the invention in a vertically fully extended state.

FIG. 1 shows a perspective schematic illustration of a system 1, 2, 3 according to the invention in a horizontally fully extended state. FIG. 2 shows the illustration of FIG. 1 without the guide assembly 1. The system 1, 2, 3 according to the invention has a guide assembly 1, a first movement assembly 2 and a second movement assembly 3.

The guide assembly 1 has a pair of guide rails 10, which are formed in a U shape and are arranged parallel to one another in such a way that the open sides of their U profiles are aligned towards one another. The guide rails 10 extend substantially in the direction of a longitudinal axis X, wherein the two guide rails 10 are upwardly curved through 90° at one end and extend vertically in the direction of a vertical axis Z which extends perpendicularly to the longitudinal axis X. In the direction of a transverse axis Y, which extends both perpendicularly to the longitudinal axis X and perpendicularly to the vertical axis Z, the two guide rails 10 are spaced from one another by lateral connecting elements 11.

The first movement group 2 has a horizontal frame part 20 and a vertical frame part 25. The horizontal frame part 20 extends substantially in the direction of the longitudinal axis X and the transverse axis Y between the guide rails 10. In the direction of the transverse axis Y, laterally outwards in each case, the horizontal frame part 20 has a first guide element 21 which faces the curved end of the guide rails 10, and a second guide element 22 which faces the vertical frame part 25. The guide elements 21, 22 are formed as rollers 21, 22, which are arranged in each case in pairs. The rollers 21, 22 run in the U-shaped guide rails 10, so that they can be held laterally as well as towards the bottom and towards the top. The horizontal frame part 20 can thus be securely guided and held, in particular at the curved end of the guide rails 10.

The two frame parts 20, 25 of the first movement assembly 2 are connected to one another by means of a pivot connection 23 in the form of a hinge 23 or a pair of hinges 23 in such a way that the otherwise horizontally aligned horizontal frame part 20 can be folded upright about the pivot axis of the hinges 23 into the vertical plane and then extends substantially parallel to the constantly vertically aligned vertical frame part 25. This enables compact storage of the horizontal frame part 20 when the system 1, 2, 3 is fully retracted. The hinges 23 are arranged between the second rollers 23.

The two frame parts 20, 25 are connected to one another by a pair of shortenable connecting elements 24 in such a way that, with a horizontal alignment of the horizontal frame part 20, the shortenable connecting elements 24 are at their maximum length, extend diagonally between the two frame parts 20, 25 and can transfer forces between the two frame parts 20, 25. If the horizontal frame part 20 is folded upright via the curved end of the guide rails 10, the shortenable connecting elements 24 can shorten their lengths. To this end, the shortenable connecting elements 24 are formed as steel cables.

The second movement assembly 3 has a vertical frame part 30 and a horizontal frame part 32, which are likewise diagonally connected to one another by a pair of connecting elements 33 in a force-transferring manner. However, the two frame parts 30, 32 are rigidly arranged orthogonally to one another and the connecting elements 33 are correspondingly rigidly formed and arranged. The connecting elements 33 here are connected to the vertical frame part 30 via projections 31 of the latter, which each project laterally in the direction of the longitudinal axis X. The horizontal frame part has, in each case laterally outwards in the direction of the transverse axis Y, a plurality of movement elements 34 in the form of rollers 34, which are arranged in the direction of the longitudinal axis X.

The guide assembly 1 is arranged in a stationary manner for example on a motorhome (not illustrated), in the interior thereof, and is located in a receiving area (not illustrated) which can be closed to the outside, for example by a hatch (not illustrated), and which serves to receive an object, for example an additional automobile.

The first movement assembly 2 is movably connected to the guide assembly 1, wherein the first movement assembly 2 can be moved in relation to the guide assembly 1 in the direction of the longitudinal axis X by means of a belt drive (not illustrated). To this end, the first pair of rollers 21 and the second pair of rollers 22 of the first movement assembly 2 run in the U-shaped guide rails 10. Owing to the hinges 23 and the shortenable connecting elements 24, the first pair of rollers 21 of the first movement assembly 2 can follow the curved course of the guide rails 10 so that the horizontal frame part 20 of the first movement assembly 2 can be folded upright.

The first movement assembly 2 can be moved out over the external dimensions of the guide assembly 1, i.e. over the horizontally extending ends of the guide rails 10, in the direction of the longitudinal axis X to the extent that the second movement assembly 3 can be positioned fully outside the external dimensions of the guide assembly 1 in the direction of the longitudinal axis X and then moved freely vertically downwards in the direction of the vertical axis Z to deposit the received objects on the ground.

The vertical frame part 30 of the second movement assembly 3 is arranged substantially within the vertical frame part 25 of the first movement assembly 2 and can be moved in relation to this in the direction of the vertical axis Z by means of a spindle drive (not illustrated) arranged in the interior of the vertical frame part 25 of the first movement assembly 2. The projections 31 of the vertical frame part 30 of the second movement assembly 3 extend here into vertical recesses 26 of the vertical frame part 25 of the first movement assembly 2 so that they do not hinder this movement and can produce the force-transferring connection to the horizontal frame part 32 of the second movement assembly 3.

FIGS. 3 to 6 show lateral schematic illustrations of a system 1, 2, 3 according to the invention in an extending movement from a fully horizontally retracted state to a fully vertically extended state.

At the start of the extending movement, the system 1, 2, 3 is located fully retracted for example in the interior of a motorhome (not illustrated) and has received an object, for example in the form of an automobile (not illustrated), on the horizontal frame part 32 of the second movement assembly 3. The system 1, 2, 3 can be arranged in the direction of the longitudinal axis X of the motorhome, i.e. in the direction of travel, or in the direction of the transverse axis Y. The second movement assembly 3 is positioned vertically in this state in such a way that it cannot hinder a horizontal movement of the first movement assembly 2. The first movement assembly 2 is maximally retracted into the guide assembly 1 and, to this end, the horizontal frame part 20 of the first movement assembly 2 is folded vertically upright so that it is arranged parallel to the vertical frame part 25 of the first movement assembly 2. In this state, the system 1, 2, 3 is compactly arranged so that the area in the interior of the motorhome can be used substantially for the received object, cf. FIG. 3.

To bring out this object, a hatch, for example, on the outer wall of the motorhome (not illustrated) should firstly be opened to reveal the receiving area in the interior. Where applicable, securing means, which are intended to secure the system 1, 2, 3 in the retracted state, should be released or removed.

The two movement assemblies 2, 3, together with the received object, can then be extended horizontally in the direction of the longitudinal axis X in relation to the guide assembly 1 (to the right in FIGS. 3 to 6). The rollers 34 of the horizontal frame part 32 of the second movement assembly 3 here roll initially in the guide rails 10 and substantially support the weight of the two movement assemblies 2, 3. The second roller pair 22 of the horizontal frame part 20 of the first movement assembly 2 also partially supports the weight of the two movement assemblies 2, 3. In this state, the first roller pair 21 of the horizontal frame part 20 of the first movement assembly 2 is still folded upright in the vertical region of the guide rails 10 and the steel cable 24 sags loosely, cf. FIG. 4. In this state, there is substantially no force transfer via these elements.

This horizontal extending movement is continued until the first movement assembly 2 is moved fully horizontally in the direction of the longitudinal axis X and the second movement assembly 3 projects fully beyond the external dimensions of the guide assembly 1, cf. FIG. 5. This horizontal position can be defined by end stops (not illustrated) of the guide rails 10 or maintained via the drives of the guide assembly 1.

In this position, the rollers 34 of the horizontal frame part 32 of the second movement assembly 3 are no longer in contact with the guide rails 10. They lose this contact in succession during the horizontal extending movement. To this end, during this extending movement, the horizontal frame part 20 of the first movement assembly 2 arrives in its horizontal orientation as a result of traveling through the curve of the guide rails 10 and the first rollers 21 of the horizontal frame part 20 of the first movement assembly 2 are then held from above by the guide rails 10. The first rollers 21 of the horizontal frame part 20 of the first movement assembly 2 can thus transfer the weight of the two movement assemblies 2, 3 increasingly to the guide rails 10 and fully take over this task in the course of the horizontal extending movement from the rollers 34 of the horizontal frame part 32 of the second movement assembly 3. The steel cables 24 are thus tensioned and support a substantial part of this weight.

In this horizontally extended position, the second movement assembly 3 with the received object projects out of the interior of the motorhome so that, if required, the object can already be accessible to the user in this position. However, to deposit the object on the ground, the second movement assembly 3 can now be moved vertically downwards in the direction of the vertical axis Z. To this end, the drives of the first movement assembly 2 lower the vertical frame part 30 of the second movement assembly 3. The projections 31 of the vertical frame part 30 of the second movement assembly 3 slide here without obstruction into the corresponding vertical recesses 26 of the vertical frame part 25 of the first movement assembly 2.

At the end of this vertical extending movement, the horizontal frame part 32 of the second movement assembly 3 is deposited on the ground so that the object can be removed at ground level, cf. FIG. 6. For example, a user is comfortably able to climb into an automobile from the side and move it down from the horizontal frame part 32 of the second movement assembly 3. This likewise applies to a dinghy of a yacht, wherein the horizontal frame part 32 here of the second movement assembly 3 would be lowered into the water. Equipment such as emergency generators, for example, can also be unloaded at ground level in this way.

A procedure for receiving an object in the motorhome by means of the system 1, 2, 3 according to the invention proceeds in the reverse order.

LIST OF REFERENCE SIGNS (part of the description)

X X axis, longitudinal axis
Y Y axis, transverse axis
Z Z axis, vertical axis, vertical direction
1 Guide assembly
10 Guide rails
11 Lateral connecting elements of the guide rails 10
2 First movement assembly
20 Horizontal frame part of the first movement assembly 2
21 First guide element or first roller of the horizontal frame part 20
22 Second guide element or second roller of the horizontal frame part 20
23 Pivot connection or hinge between horizontal frame part 20 and vertical frame part 25 of the first movement assembly 2
24 Shortenable connecting elements or diagonal struts between horizontal frame part 20 and vertical frame part 25 of the first movement assembly 2
25 Vertical frame part of the first movement assembly 2
26 Vertical recesses or slots of the vertical frame part 25
3 Second movement assembly
30 Vertical frame part of the second movement assembly 3
31 Projections of the vertical frame part 30
32 Horizontal frame part of the second movement assembly 3
33 Rigid connecting elements or diagonal struts between vertical frame part 30 and horizontal frame part 32 of the second movement assembly 3
34 Movement elements or rollers of the horizontal frame part 32 of the second movement assembly 3

The invention claimed is:

1. A system for receiving objects, having
a guide assembly, which can be arranged in a stationary manner,
a first movement assembly, which is connected to the guide assembly and which can be horizontally movable in relation to the guide assembly in the direction of a longitudinal axis, and
a second movement assembly, which is connected to the first movement assembly and which can be vertically movable in relation to the first movement assembly in the direction of a vertical axis and can receive the objects,
wherein the first movement assembly can be moved out over the guide assembly in the direction of the longitudinal axis to the extent that the second movement assembly can be moved in relation to the first movement assembly, past the guide assembly, in the direction of the vertical axis,
wherein the first movement assembly has a horizontal frame part and a vertical frame part,
wherein the horizontal frame part of the first movement assembly connects the first movement assembly to the guide assembly such that it is movable in the direction of the longitudinal axis, and
wherein the vertical frame part of the first movement assembly connects the second movement assembly to the first movement assembly such that it is movable in the direction of the vertical axis,
characterized in that the horizontal frame part of the first movement assembly and the vertical frame part of the first movement assembly are connected to one another by a diagonal connecting element; and
wherein the horizontal frame part of the first movement assembly and the vertical frame part of the first movement assembly are connected to one another by a pivot connection so that the horizontal frame part of the first movement assembly can be swiveled in relation to the vertical frame part of the first movement assembly between the direction of the longitudinal axis and the direction of the vertical axis.

2. The system as claimed in claim 1, wherein the connecting element is formed such that it can be shortened.

3. The system as claimed in claim 1, wherein the horizontal frame part of the first movement assembly has at least two guide elements, with which the horizontal frame part of the first movement assembly is movably connected to the guide assembly.

4. The system as claimed in claim 3, wherein the at least two guide elements comprise rollers.

5. The system as claimed in claim 1, wherein the guide assembly has at least one guide rail, in which the first movement assembly, can be movably guided.

6. The system as claimed in claim 5, wherein the guide rail(s) is/are formed in a U shape.

7. The system as claimed in claim 5, wherein the guide rail(s) is/are formed such that they are upwardly curved in portions in the direction of the vertical axis.

8. The system as claimed in claim 5, wherein the at least one guide rail comprises a pair of guide rails.

9. The system as claimed in claim 1, wherein the second movement assembly has a vertical frame part and a horizontal frame part,
wherein the vertical frame part of the second movement assembly connects the second movement assembly to the first movement assembly such that it is movable in the direction of the vertical axis, and
wherein the horizontal frame part of the second movement assembly is formed for receiving objects.

10. The system as claimed in claim 9, wherein the vertical frame part of the second movement assembly is movable in relation to the first movement assembly, in particular in relation to the vertical frame part of the first movement assembly, by means of a spindle drive or a hydraulic drive.

11. The system as claimed in claim 9, wherein the vertical frame part of the second movement assembly is arranged within the vertical frame part of the first movement assembly such that it is movable in the direction of the vertical axis.

12. The system as claimed in claim 9, wherein the vertical frame part of the second movement assembly and the horizontal frame part of the second movement assembly are connected to one another by diagonal connecting element.

13. The system as claimed in claim 12, wherein the vertical frame part of the first movement assembly has at least one vertical recess in which a projection of the vertical frame part of the second movement assembly can extend in a vertically movable manner,
wherein the diagonal connecting element is connected to the vertical frame part of the second movement assembly via the projection.

14. The system as claimed in claim 13, wherein the vertical frame part of the first movement assembly has a pair of vertical recesses, in which projections of the vertical frame part of the second movement assembly can extend in a vertically movable manner.

15. The system as claimed in claim 12, wherein the vertical frame part of the second movement assembly and the horizontal frame part of the second movement assembly are connected to one another by a pair of diagonal connecting elements.

16. The system as claimed in claim 1, wherein the second movement assembly, has a plurality of movement elements by means of which the second movement assembly can be guided such that it is movable in relation to the guide assembly in the direction of the longitudinal axis.

17. The system as claimed in claim 16, wherein the plurality of movement elements comprises a plurality of rollers on the horizontal frame part of the second movement assembly.

18. The system as claimed in claim 1, wherein the horizontal frame part of the first movement assembly and the vertical frame part of the first movement assembly are connected to one another by a pair of diagonal connecting elements.

19. A system for receiving objects, having
a guide assembly, which can be arranged in a stationary manner,
a first movement assembly, which is connected to the guide assembly and which can be horizontally movable in relation to the guide assembly in the direction of a longitudinal axis, and
a second movement assembly, which is connected to the first movement assembly and which can be vertically movable in relation to the first movement assembly in the direction of a vertical axis and can receive the objects,
wherein the first movement assembly can be moved out over the guide assembly in the direction of the longitudinal axis to the extent that the second movement assembly can be moved in relation to the first movement assembly, past the guide assembly, in the direction of the vertical axis,
wherein the first movement assembly has a horizontal frame part and a vertical frame part,
wherein the horizontal frame part of the first movement assembly connects the first movement assembly to the guide assembly such that it is movable in the direction of the longitudinal axis, and
wherein the vertical frame part of the first movement assembly connects the second movement assembly to the first movement assembly such that it is movable in the direction of the vertical axis,
characterized in that the horizontal frame part of the first movement assembly and the vertical frame part of the first movement assembly are connected to one another by a diagonal connecting element; and
wherein the guide assembly has at least one guide rail in which the first movement assembly can be movably guided, and wherein the guide rail(s) is/are formed in a U shape.

20. A system for receiving objects, having
a guide assembly, which can be arranged in a stationary manner,
a first movement assembly, which is connected to the guide assembly and which can be horizontally movable in relation to the guide assembly in the direction of a longitudinal axis, and
a second movement assembly, which is connected to the first movement assembly and which can be vertically movable in relation to the first movement assembly in the direction of a vertical axis and can receive the objects,
wherein the first movement assembly can be moved out over the guide assembly in the direction of the longitudinal axis to the extent that the second movement assembly can be moved in relation to the first movement assembly, past the guide assembly, in the direction of the vertical axis,
wherein the first movement assembly has a horizontal frame part and a vertical frame part,
wherein the horizontal frame part of the first movement assembly connects the first movement assembly to the guide assembly such that it is movable in the direction of the longitudinal axis, and wherein the vertical frame part of the first movement assembly connects the second movement assembly to the first movement assembly such that it is movable in the direction of the vertical axis, characterized in that the horizontal frame part of the first movement assembly and the vertical frame part of the first movement assembly are connected to one another by a diagonal connecting element; and wherein the guide assembly has at least one guide rail in which the first movement assembly can be movably guided, and wherein the guide rail(s) is/are formed such that they are upwardly curved in portions in the direction of the vertical axis.

* * * * *